June 7, 1949.  W. H. WALKER  2,472,132
AUTOMOBILE CLOTHES RACK
Filed March 20, 1947  2 Sheets-Sheet 1
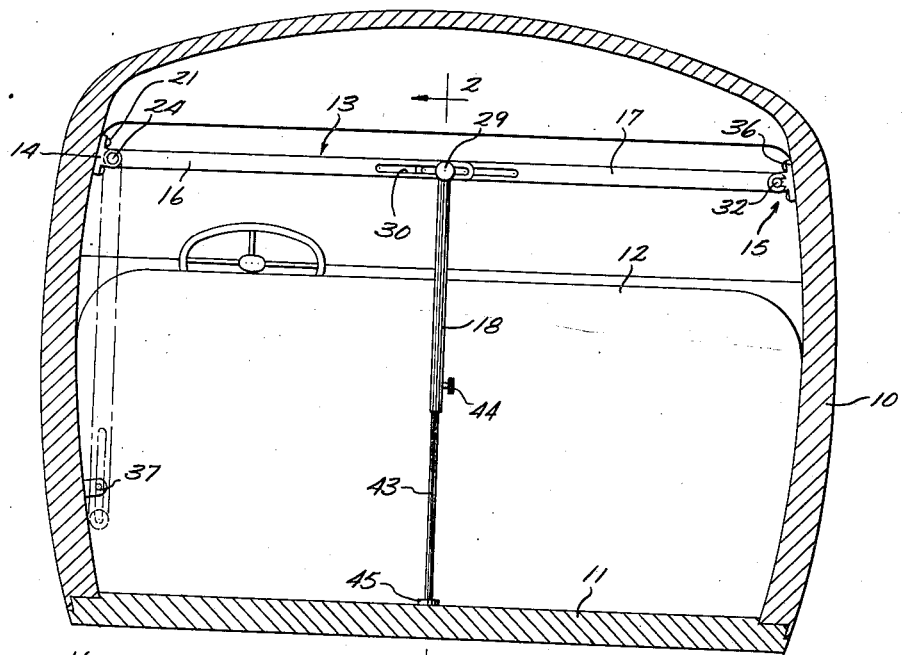
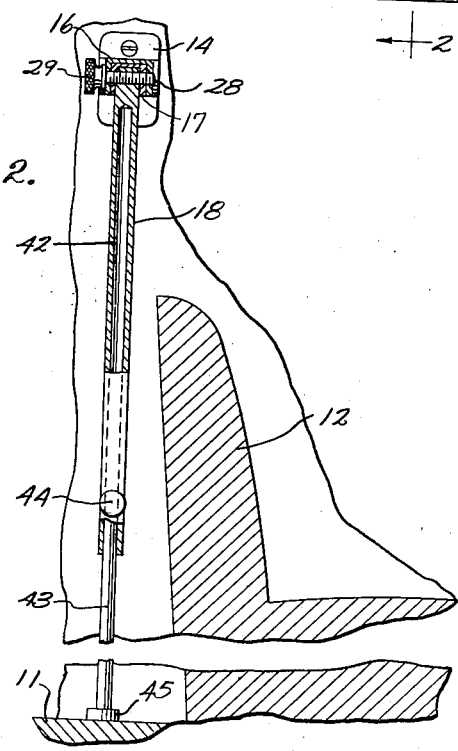
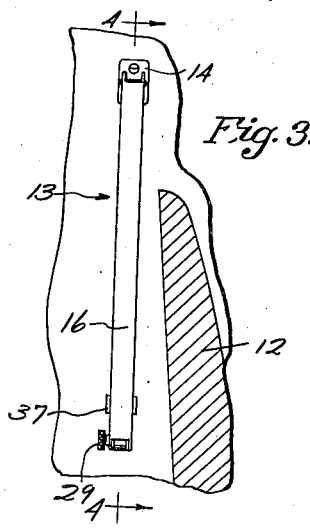
INVENTOR.
William H. Walker,
BY Victor J. Evans & Co.
ATTORNEYS

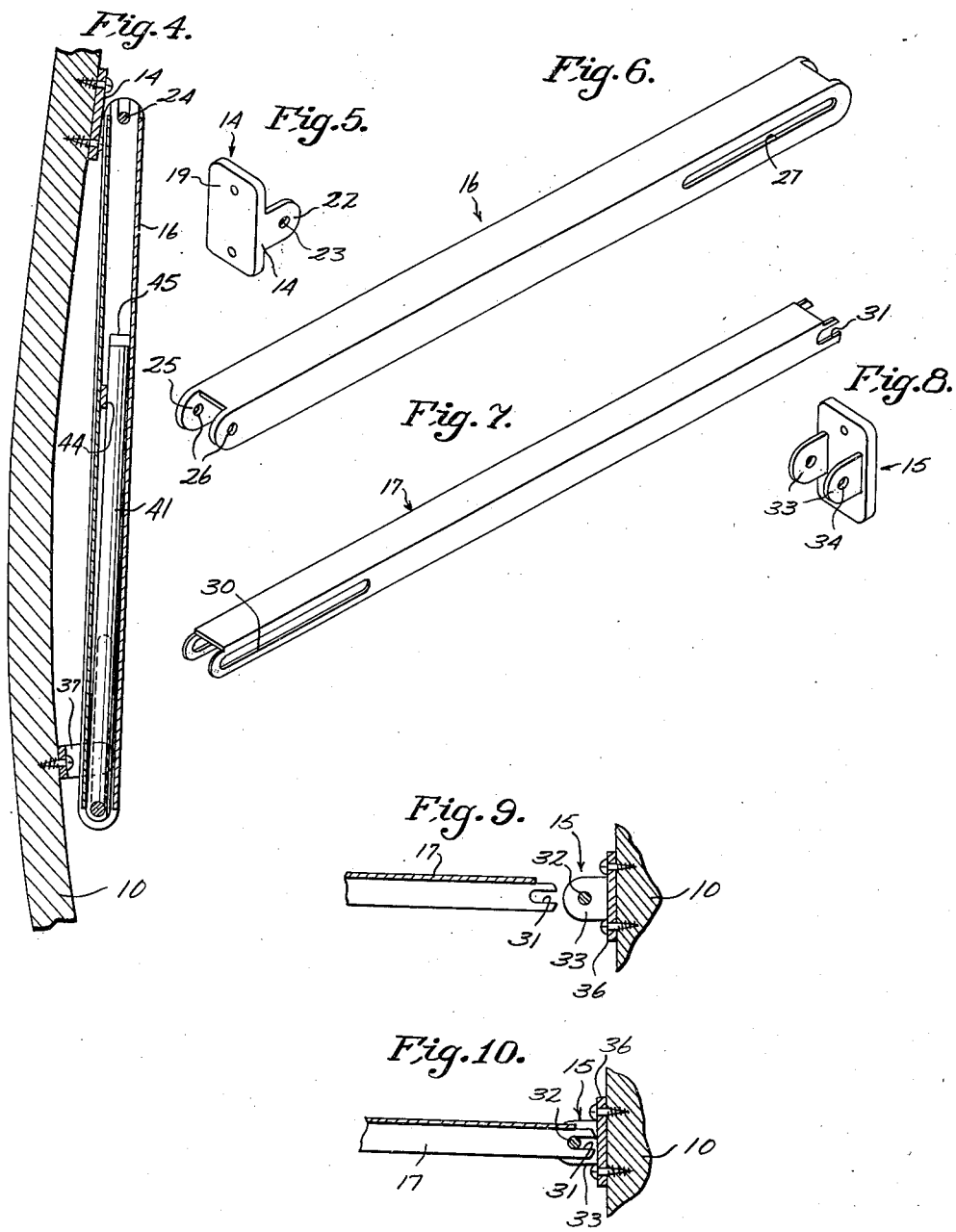

Patented June 7, 1949

2,472,132

UNITED STATES PATENT OFFICE 2,472,132

AUTOMOBILE CLOTHES RACK

William H. Walker, Alameda, Calif.

Application March 20, 1947, Serial No. 735,987

1 Claim. (Cl. 224—29)

This invention relates to an automobile clothes rack.

It is an object of the present invention to provide a clothes rack for automobiles on which shirts, blouses, overcoats, suits or any other article which the owner would not care to pack in a bag may be supported so that they will remain neatly pressed as though taken from the closet at home.

It is another object of the present invention to provide in an automobile rack articulated members such that the rack may extend from one side of the car to the other, be supported in the center and adapted to be folded when released from its connection at one side of the automobile and supported at the other side of the car as when the same is not in use, and wherein the operations required for setting up the clothes rack within the car are simple and quickly done and likewise wherein the folding operations may be simple and quickly carried out to return the clothes rack to its out-of-use position.

It is another object of the present invention to provide a clothes rack for automobiles which is of simple construction, easy to install and efficient in operation.

For other objects and for a better understanding of the invention, reference may be had to the following detailed description taken in connection with the accompanying drawing, in which Fig. 1 is a transverse cross-sectional view of the body of the automobile and looking upon the back of the front seat and in elevation upon the clothes rack of the present invention set up to support clothes.

Fig. 2 is a longitudinal cross-sectional view of the body of the automobile and of the support for the rack intermediate its length and as viewed on line 2—2 of Fig. 1 and looking in the direction of the arrows thereof.

Fig. 3 is a fragmentary view of the side of the automobile and looking upon the rack after it has been folded and placed upon the side of the automobile in its out-of-use position.

Fig. 4 is a transverse cross-sectional view of the rack in its folded position upon the side of the automobile and as viewed upon line 4—4 of Fig. 3 and looking in the direction of the arrows thereof.

Fig. 5 is a perspective view of one of the brackets disposed upon the side of the car and particularly the bracket that retains the rack in its folded and out-of-use position.

Fig. 6 is a perspective view of one part of the rack parts.

Fig. 7 is a perspective view of the outer rack part or the part which is connected to the side of the car from which the parts are supported when not in use.

Fig. 8 is a detail perspective view of a bracket which is connected to the side of the car to support the rack when it is extended.

Fig. 9 is a fragmentary and cross-sectional view showing the rack parts about to be connected to its bracket as at a time when the rack is being set up for use.

Fig. 10 is a similar cross-sectional and fragmentary view after the rack part has been assembled to the bracket.

Referring now to the figures, 10 represents the body of an automobile and 11 the floor thereof. Upon the floor there is rested a front seat 12 which divides the front compartment of the automobile from the rear compartment. Within the rear compartment of the automobile and in rear of the front seat, my clothes rack may be installed. This rack is indicated generally at 13 and includes brackets 14 and 15 which are fixed by screws to the sides of the body 10 and within the rear compartment. When the clothes rack is extended its two parts 16 and 17 will span the distance between the brackets 14 and 15 and the parts 17 will be connected to the bracket 15. Intermediate the length of the rack and connected to the parts at the location where they may be pivoted relative to each other as when the rack is folded into its out-of-use position, is a support 18 adapted to engage with the floor 11 of the automobile body.

In Fig. 5 there is shown in detail the bracket 14 which is shown to constitute a base 19 by which it is attached to the side of the automobile body as by screws 21 and which has extending from its side edges and inwardly thereof, lugs of projections 22 with holes 23 therein by which part 16 can be connected to the bracket 14 as by a pin 24 which will extend through the holes 23.

The part 16 is of channel section and has connecting and rounded portions 25 with holes 26 thereon, adapted to be extended between the ears 22 of the bracket 14 to receive the pin 24.

The opposite end of the part 16 has in its flange portions elongated slots 27 through which may slide a screw 28 with a hand turning portion 29 thereon. To this screw there is attached the part 17 which also has elongated slots 30 and which is smaller than the channel part 16 and can fit upwardly between its flanges thereof. Thus the part 17 can be longitudinally adjusted relative to the part 16. The outer end of the part 17 has in its end and in the flanges thereof open ended slots 31 adapted to be fitted over a pin 32 extending between ear projections 33 within holes 34 thereof, of the bracket 15 disposed and fixed to the side of the automobile body by screws 36. The bracket 15 is similar to the bracket 14 except that the ear projections are closer together to receive the more narrow channel part 17. As illustrated in Figures 9 and 10 the part 17 due to the slots 30 thereof can be adjusted laterally so as to be fitted over the pin 32 of the bracket 15. When the part 17 is disconnected from the bracket 15 the same can be folded into the part 16 and both parts folded down on pin 24 of the bracket 14 and into a clip 37 on the side of the automobile and there be retained in an out-of-use position, readily accessible to be again set up and entirely out of the way.

In order that the parts will be supported when carrying a heavy load, there is connected by the same screw 28 a standard 41 formed of telescopically arranged parts 42 and 43. The part 43 is slid into the part 42 and is retained in an adjusted position therewithin by a set screw 44. The lower end of the part 43 has a foot portion 45 thereon. The standard 41 can pivot on the screw 28 whereby it can be folded into the small channel part 17 and be stored away with the parts when these parts are disposed in the out-of-use position.

While various changes may be made in the detailed construction, it shall be understood that such changes shall be within the spirit and scope of the present invention as defined by the appended claim.

I claim:

A foldable automobile clothes rack comprising brackets adapted to be connected respectively to the opposite sides of the automobile body, two rack parts connected together to be pivoted relative to one another and to be extended relative to each other for a limited distance, one of the parts being pivotally connected to one of the brackets and the other of said parts adapted to be detachably connected to the other of said brackets, said parts when not in use being adapted to be detached from the bracket at one side of the automobile body and pivoted upon one another and upon the bracket at the opposite side of the body and downwardly to extend in a vertical position and out of the way, the connection between these parts being effected by a pin extending transversely of the same, both of said parts having elongated slots at the ends where they are connected together, and said pin extending transversely through the elongated slots whereby to permit both pivotal and a longitudinal adjustment of the parts, and a standard connected to the pin and adapted to engage with the floor of the automobile body to support the rack intermediate its length, said rack parts being of channel formation and the slots extending through flange portions thereof, the one channel part adapted to be detachably connected to the bracket being smaller than the other channel part and adapted to be lifted into the larger channel part as when the parts are being folded to be located in their out-of-use position, and said standard being adapted to fit within the small channel part and be adjusted into the same as when the parts are folded together and into the out-of-use position.

WILLIAM H. WALKER.

REFERENCES CITED

The following references are of record in the file of this patent:

UNITED STATES PATENTS

| Number | Name | Date |
|---|---|---|
| 812,396 | Bewyer | Feb. 13, 1906 |
| 1,752,472 | Whitney | Apr. 1, 1930 |
| 1,793,035 | Whitney | Feb. 17, 1931 |
| 2,056,544 | Vanderveld | Oct. 6, 1936 |
| 2,144,772 | Plants | Jan. 24, 1939 |
| 2,253,423 | Fellers | Aug. 19, 1941 |